United States Patent [19]

Webster, III

[11] Patent Number: 5,142,619
[45] Date of Patent: Aug. 25, 1992

[54] METHOD AND APPARATUS FOR VISUALLY COMPARING FILES IN A DATA PROCESSING SYSTEM

[75] Inventor: John W. Webster, III, Apex, N.C.

[73] Assignee: International Business Machines Corporation, Armonk, N.Y.

[21] Appl. No.: 752,882

[22] Filed: Aug. 23, 1991

Related U.S. Application Data

[63] Continuation of Ser. No. 482,470, Feb. 21, 1990, abandoned.

[51] Int. Cl.⁵ .............................................. G06F 3/14
[52] U.S. Cl. .................... 395/157; 395/161
[58] Field of Search ................. 395/145-147, 395/149, 155, 157, 151; 340/734; 382/34, 57

[56] References Cited

U.S. PATENT DOCUMENTS

| | | | |
|---|---|---|---|
| T922,008 | 5/1974 | Gause et al. | 444/1 |
| 3,568,156 | 8/1967 | Thompson | 340/172.5 |
| 4,121,196 | 10/1978 | Johnson et al. | 382/41 |
| 4,430,725 | 2/1984 | Elliott et al. | 364/900 |
| 4,524,427 | 6/1985 | Vidalin et al. | 364/900 |
| 4,525,803 | 6/1985 | Vidalin et al. | 364/900 |
| 4,555,775 | 11/1985 | Pike | 364/900 |
| 4,641,274 | 2/1987 | Swank | 364/900 |
| 4,710,767 | 12/1987 | Sciacero et al. | 340/723 X |
| 4,723,209 | 2/1988 | Hernandez | 364/300 |
| 4,723,210 | 2/1988 | Barker et al. | 364/300 |
| 4,827,330 | 5/1989 | Walsh et al. | 382/57 X |
| 4,864,629 | 9/1989 | Deering | 382/34 |
| 4,958,378 | 2/1990 | Bell | 340/721 X |

OTHER PUBLICATIONS

Mano M., "Computer Systems Arichitecture", Prentice-Hall Inc., 1976, pp. 1-5.
T. R. Hopper et al, "Program for Determining Text Updates", Nov. 1975, IBM TDB vol. 18 No. 6, pp. 1792, 1793.
S. Todd, "Serial File Merging Device", Aug. 1978, IBM TDB vol. 21 No. 3, pp. 1244, 1245.
Word Perfect Corp., "Word Perfect for IBM Personal Computers", Apr. 1986, pp. 119, 120.

*Primary Examiner*—David L. Clark
*Attorney, Agent, or Firm*—Marc Block; Douglas McKechnie

[57] ABSTRACT

A method and apparatus for visually comparing two files or portions thereof by visually indicating to the user areas of identity and differences between the items being compared. The items are stored in a video RAM which controls the visual presentation on the screen. The respective pixel settings in the video RAM are exclusively or'ed and the results are then stored in the video RAM so that the difference between the two items are displayed. A user can edit each item, while the comparison is being made, so that the effect of the editing on the differences, is immediately shown and apparent to the user.

2 Claims, 4 Drawing Sheets

METHOD AND APPARATUS FOR VISUALLY COMPARING FILES IN A DATA PROCESSING SYSTEM

This application is a continuation of application Ser. No. 07/482,470 filed Feb. 21, 1990, now abandoned.

This invention relates to a method and an apparatus for visually comparing files in a data processing system.

BACKGROUND OF THE INVENTION

During the course of text or word processing, it is quite common for a user to compare, or want to compare, two substantially similar files or portions thereof, to ascertain the differences. Quite obviously, the user can do so by proofreading, i.e., visually comparing the two files word-by-word and noting any differences. Such method is time consuming particularly for long documents. Some data processing systems facilitate such method by allowing the user to display the files on separate screens, on a split screen, or in windows on a screen. Some systems employ software which compares the files character-by-character and produces a printout indicating which lines are the same, which lines have been changed, which lines have been deleted, and which lines have been inserted. The user must then take the printout and compare it with one of the files to locate all of the changes.

The commercially available WordPerfect word processor, version 5.0, available from WordPerfect Corporation, has a document compare function which compares a document on screen with a document on disk and redlines text on the screen which does not appear in the text on disk. Text, which exists in the file on disk but not in the file originally on screen, is copied to the screen and indicated with strikeout codes. In general, the prior art methods of software comparison has treated the problem as one of text comparison using text string matching and sorting while the method of the invention, as described in more detail hereinafter, uses a different approach by exploiting raster graphics or bit mapping technology to provide a rapid visual comparison.

Personal Editor/2 word processor, commercially available from IBM Corporation, has a feature which allows a visual comparison to be made rapidly. The two files to be compared are loaded into storage, using the edit function, and placed in a ring buffer. These two files should be the only ones currently loaded. Next, the texts for the separate screens are edited or moved about to bring the portions to be compared into similar positions on their respective screens. Then by holding down the editing function key (F8), the screens for the two files are rapidly and successively switched so that differences and common areas of text, are readily apparent.

SUMMARY OF THE INVENTION

One of the objects of the invention is to provide a method which rapidly presents a user with a visual comparison of two files or portions thereof.

Another object is to provide a method for displaying only the differences between two files being compared.

Still another object is to compare two text items, not on the basis of actual text or characters, but on the basis of pixel contents to ascertain areas of identity and differences.

A further object is to provide a windowing system in which two items being compared can be placed in separate windows, and differences between the two items displayed in a third window.

A still further object is to allow at least one of two items being compared to be edited while the effects of the editing are effectively immediately presented to the user on a screen in such a manner that any differences between the two items are immediately apparent.

Briefly, in accordance with the invention, the advantage of which will be apparent from the simplicity of the solution, representations of two items being compared are first respectively stored in one or more bit planes. Such representations are compared and the results stored in another area of the same bit plane or a different one. The results are then displayed, providing the user with a visual comparison.

DRAWINGS

Other objects and advantages of the invention will be apparent from the following description taken in connection with the accompanying drawings wherein.

DETAILED DESCRIPTION

Figure 1:
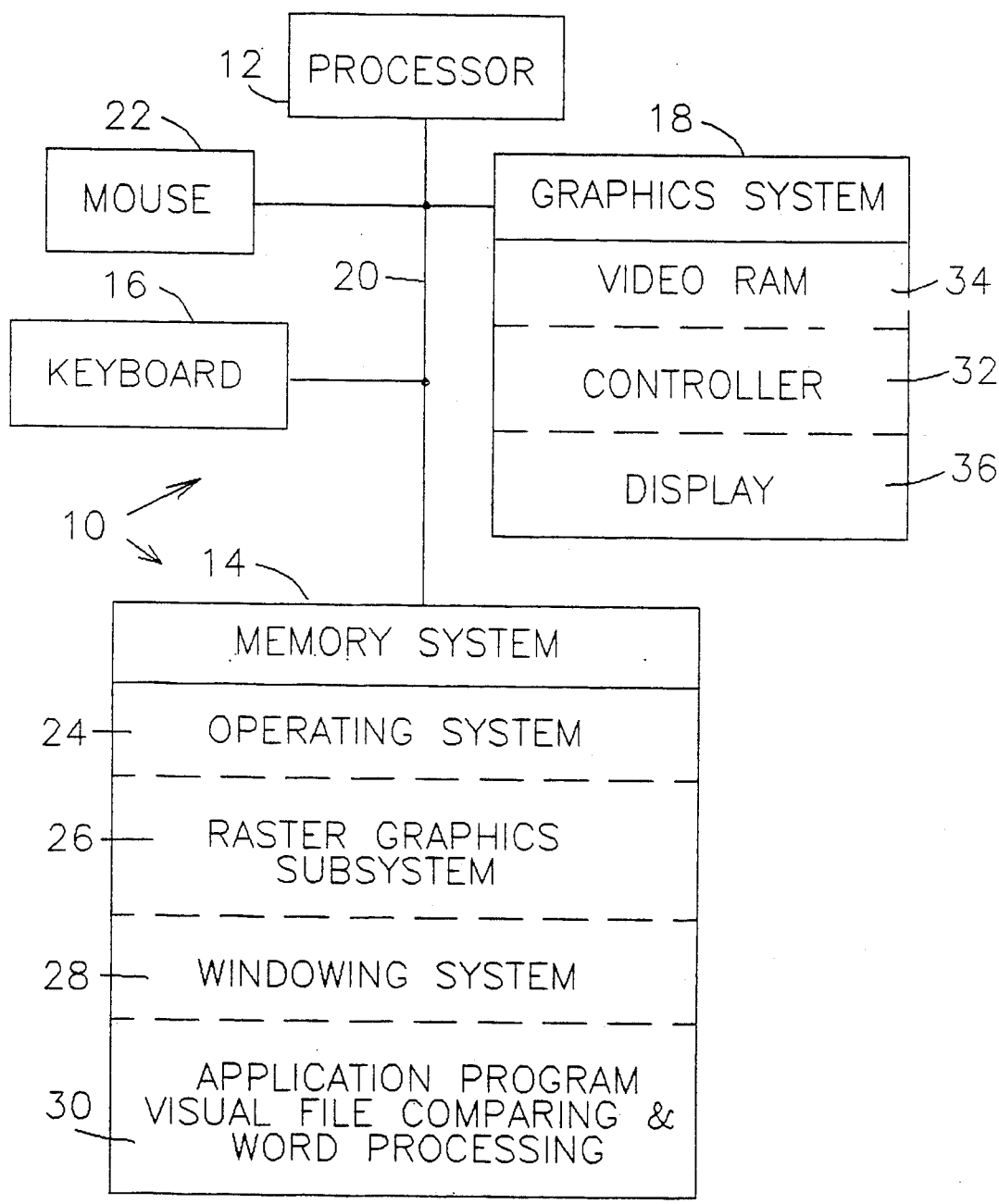
FIG. 1 is a block diagram of a data processing system embodying the invention.

Referring now to the drawings and first to FIG. 1, the invention is embodied in a data processing system including a personal computer 10 that comprises a processor 12, a memory system 14, a keyboard 16, and a graphics system 18 all of which are interconnected by a bus system 20. Optionally but preferably, the system further includes a mouse 22. Stored in memory system 14 are an operating system 24, a raster graphics subsystem 26, a windowing system 28, and an application program 30 that performs word processing and visual file comparison, as described in detail below.

Except for some of the details of program 30, all of the other elements are well known, conventional items. Personal computer 10 is preferably an IBM Personal System/2 computer provided with an OS/2 operating system 24 that includes Presentation Manager windowing system 28 and graphics device interface (GDI) subsystem 26. (IBM, Personal System/2, and OS/2 are trademarks of International Business Machines Corporation). Computer 10 operates in a conventional fashion. Processor 12 executes programs that are stored in memory system 14 which system includes conventional devices (not shown) such as read only memory, random access memory, cache, hard disc and floppy disc as appropriate to the particular model computer being used. Keyboard 16 is used to input text and information from the user into the system, mouse 22 is useful in manipulating windows and files, and graphics system 18 displays information for viewing by the user. The combined function of the graphics system, the mouse, and the keyboard is to provide interaction between the user and the computer. Program 30 provides an on-line, interactive, visual file comparison system, in the manner described in more detail hereinafter.

System 18 includes a video controller 32, a video random access memory (RAM) 34, and a display 36 all of which operate in conventional fashion so that only such details as are necessary to understand the invention, will be discussed herein. Display 36 contains a matrix of pixels the status of which are controlled by the contents of video RAM 36. Controller 32 functions to change the contents of RAM 34 into video on display 36. Such a system is known as a bit mapped graphics system. The display produces a background color and one or more foreground colors dependent whether the display is a monochrome or a color display and on the status of the pixels. A pixel is "on" or viewable by a user only when its foreground color is different from the background color. The pixel is "off" when it produces a background color. In accordance with the invention, the differences between two files being compared will be displayed to the user by setting those pixels representing the differences to a foreground color, i.e., turning such pixels on.

Windowing system 28 allows one or more windows to be displayed on display 36, in a known manner. In general, such system keeps track of the windows and their contents and provides the appropriate code to video RAM 34. Application program 30 interacts with the user and system 28 whereby program 30 will initiate the opening, loading, editing and closing of the windows used by it.

Figure 2:
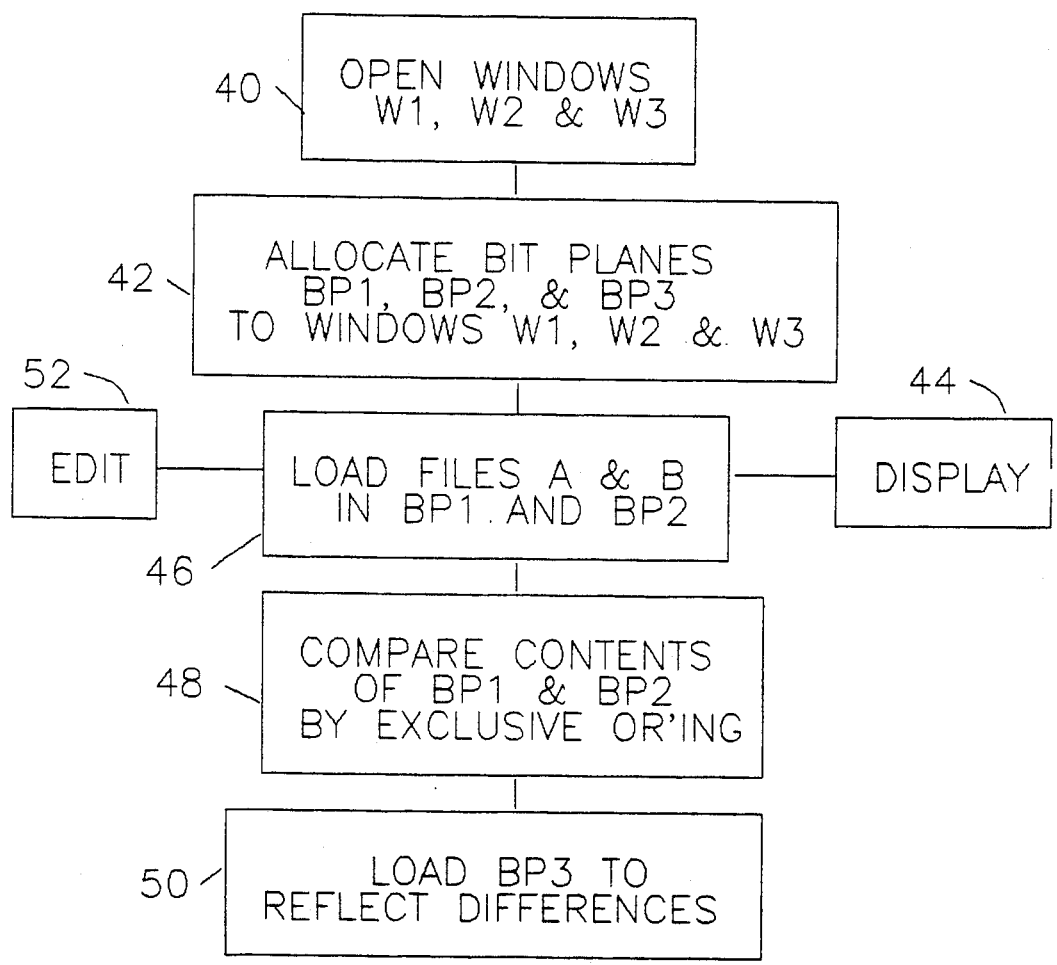
FIG. 2 is a flow chart illustrating the method of the invention.

Referring to FIG. 2, in accordance with the general method of the invention, the user first determines or initiates the process of visually comparing two files A and B. Upon initiation, step 40 opens three windows W1, W2 and W3 which are of the same size but positioned at separate locations on the display. Step 42 allocates three bit planes BP1, BP2 and BP3 in the video RAM to the respective windows. Step 44 displays the windows W1-W3 on the display. Step 46 loads files A and B into bit planes BP1 and BP2 with the result that the contents of such files are displayed in windows W1 and W2. Step 48 then compares the contents of bit planes BP1 and BP2 on a pixel-by-pixel basis by exclusive or'ing. For each pair of pixels being compared, a corresponding pixel in BP3 is set off in step 50 to the background color when the two pixels are the same and set on to the foreground color when the two pixels are different. The loading or setting of bit plane BP3 displays such differences since points of similarity are converted to background color which is indistinguishable to the user. Step 52 allows the contents of the displayed files to be edited. Normally, only one file at a time would be edited and the editing would be done by moving the text about its respective window to bring the similar portions into corresponding alignment so as to eliminate them from view on the display. Only the differences would remain after similar portions have been aligned.

Figure 3:
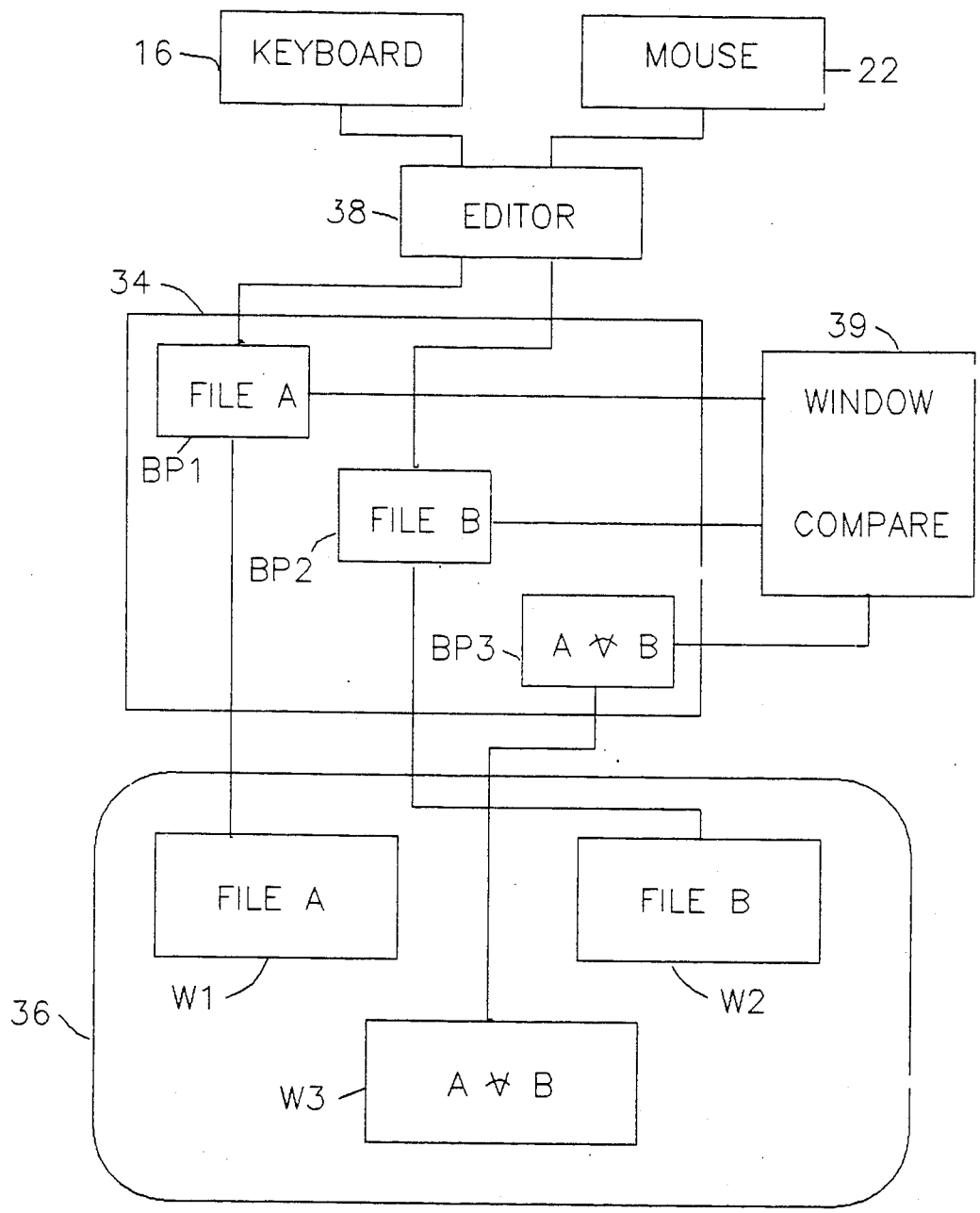
FIG. 3 is a block diagram illustrating further details of the invention.

FIG. 3 illustrates such invention in apparatus form. Three windows W1-W3 are formed or displayed on display 36, the windows being of the same size but positioned at different location on the display. The contents of the windows are controlled by the contents of video RAM 34 which is mapped into three bit planes BP1-BP3 corresponding to windows W1-W3. An editor 38 loads files A and B into bit planes BP1 and BP2 and edits the contents thereof under control of keyboard 16 and mouse 22 as actuated by the user. Means 39 for comparing the contents of bit planes BP1 and BP2 are provided for comparing the respective pixel locations and exclusive or'ing each pair of corresponding pixels to set a corresponding pixel location in bit plane BP3 to reflect similarity or dissimilarity between the compared pair of pixels. Editor 38 and window compare means 39 are formed by the interaction of program 30 with processor 12 during execution of such program and represents the apparatus formed by software executing on hardware.

Figure 4:
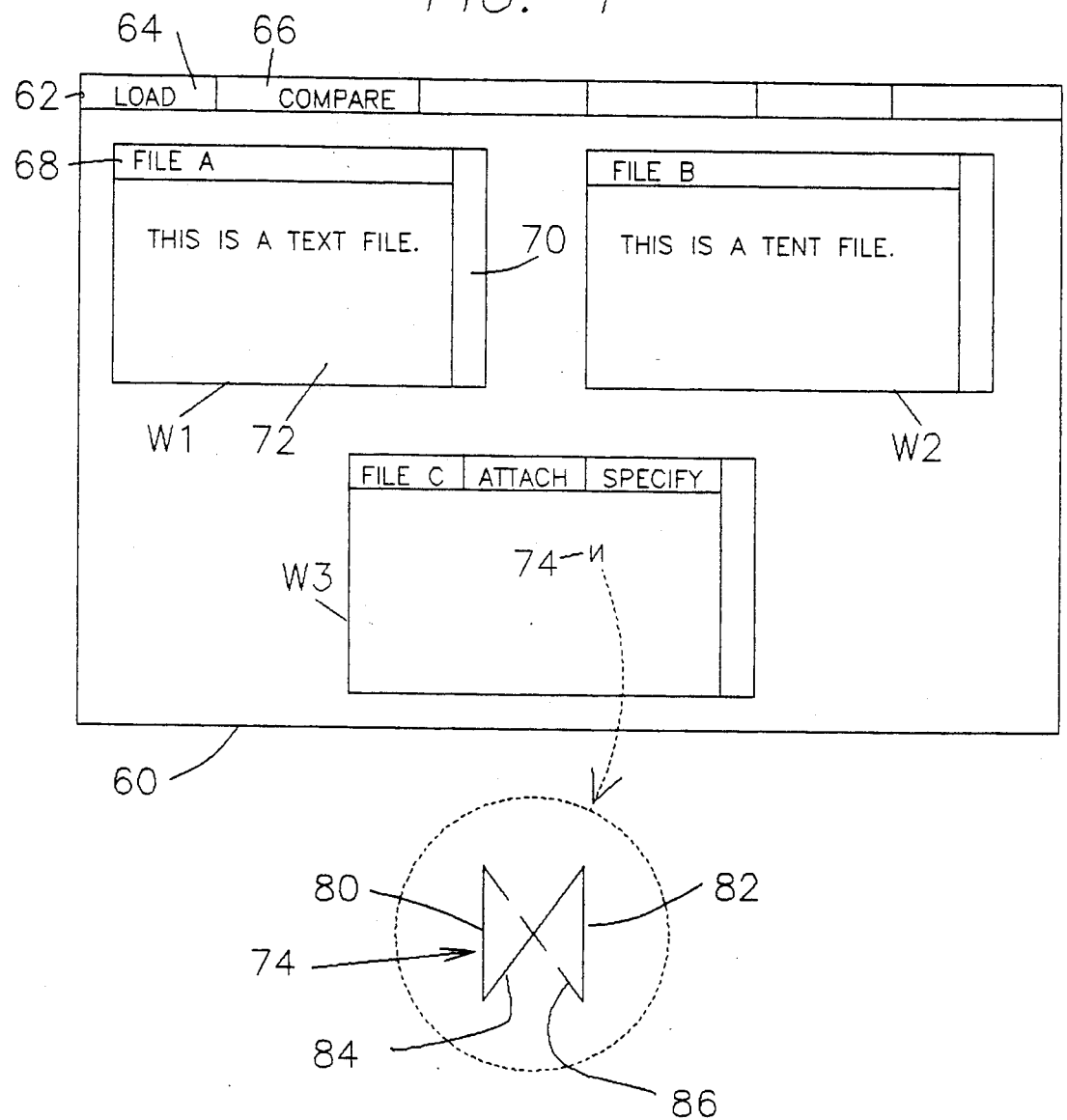
FIG. 4 is a schematic diagram of a display screen illustrating use of the invention.

FIG. 4 illustrates how a screen 60 on display 36 might be designed and operated. The screen is set up by the windowing system and includes an action bar 62 along the top edge which displays various commands including LOAD and COMPARE in areas 64 and 66 of the action bar. The commands are selectable by moving the mouse to position the cursor in the area containing the desired command and then clicking the mouse. The three windows W1-W3 are located on the screen at different areas so as to clearly present their contents to the user. Window W1 has a title bar 68 at the top displaying the name of the file being displayed therein, and a scroll bar 70 along the right edge. The other windows have similar layouts except that the title bar of window W3 also includes two areas 76 and 78 containing commands ATTACH and SPECIFY.

To illustrate the invention, assume file A contains the sentence, THIS IS A TEXT FILE, and that file B contains the sentence, THIS IS A TENT FILE. Obviously, the differences are in the third letter of the fourth word of each sentence. At the start, the LOAD command in area 64 is clicked on twice to load the files into windows W1 and W2. The COMPARE command is then clicked on and this allows the respective files to be edited to bring their contents into respective alignment. As editing occurs, the differences are displayed on the screens. When aligned in the best manner, only the difference 74 appears on window W3. The difference is better understood from the blow up shown in the dotted circle in FIG. 4 wherein the difference lines 80, 82 and 84 are shown solid and would be visible to the user in window W3. The dashed line 86 represents the common cross bar of both the "X" and the "N'. This difference is produced by exclusive or'ing the pixels representing the letters "X" and "N'. Once the differences become apparent, the user can then select the commands ATTACH and SPECIFY. ATTACH ties all three windows together so that scrolling occurs in synchronism. SPECIFY allows the user to tell the system what to do with the difference such as delete it from file A, add it to file B, leave it, or put in something different.

A simple variation or change useful to some users would be to display the two files in different colors and to use the same colors in the difference window, so the user could discern which file contains the differences. It should be apparent to those skilled in the art that other changes can be made in the details and arrangements of steps and parts without departing from the scope of the invention as defined in the appended claims.

What is claimed is:

1. A method of simultaneously presenting to a user on a display, which includes storage which contains representations for display pixels, two files and the differences therebetween, the method comprising the steps of:

storing, in a first area in the display storage, the display pixel representations of one of said files;

storing, in a second area in the display storage, the display pixel representations of the other one of said files;

comparing said pixel representations in said first area with those in said second area on a pixel-by-pixel basis and storing in a third area of said display memory pixel representations of differences therebetween;

responsive to input from the user, editing one of the files, simultaneously updating the differences stored in the third area, and displaying those differences to the user;

wherein the user is continuously presenting with the updated files; and differences which the user may further edit; and displaying, on the display, commands available to user which includes the steps of:

displaying, on the display, a command that invokes the comparing step;

displaying, on the display, an ATTACH command; and responsive to the user invoking the ATTACH command, tying together the contents of the three areas to enable synchronous scrolling.

2. A method of simultaneously presenting to a user on a display, which includes storage which contains representations for display pixels, two files and the differences therebetween, the method comprising the steps of:

storing, in a first area in the display storage, the display pixel representations of one of said files;

storing, in a second area in the display storage, the display pixel representations of the other one of said files;

comparing said pixel representations in said first area with those in said second area on a pixel-by-pixel basis and storing in a third area of said display memory pixel representations or differences between pixels that have been compared;

activating pixels on said display in accordance with said pixel representations in said display storage so as to simultaneously display to a user said two files and all differences therebetween;

responsive to input from the user, editing one of the files, simultaneously updating the differences stored in the third area, and displaying those differences to the user;

wherein the user is continuously presented with the updated files; and differences which the user may further edit; and displaying, on the display, a command that invokes the comparing step;

displaying, on the display, commands specifying how the difference is to be applied to the first file or second file; and selectively either deleting the difference from one of the files, adding the differences to one of the files, or editing the differences in response to the user selecting one of the specifying command.

* * * * *